(12) United States Patent
Kim (10) Patent No.: US 10,757,928 B2
(45) Date of Patent: Sep. 1, 2020

(54) ULTRASONIC GENERATOR

(71) Applicant: Seog-tae Kim, Wonju-si (KR)

(72) Inventor: Seog-tae Kim, Wonju-si (KR)

( * ) Notice: Subject to any disclaimer, the term of this patent is extended or adjusted under 35 U.S.C. 154(b) by 353 days.

(21) Appl. No.: 15/567,654

(22) PCT Filed: Apr. 22, 2016

(86) PCT No.: PCT/KR2016/004257
§ 371 (c)(1),
(2) Date: Oct. 19, 2017

(87) PCT Pub. No.: WO2016/171520
PCT Pub. Date: Oct. 27, 2016

(65) Prior Publication Data
US 2018/0092346 A1    Apr. 5, 2018

(30) Foreign Application Priority Data

Apr. 23, 2015    (KR) .................. 10-2015-0057369

(51) Int. Cl.
*H04R 9/06* (2006.01)
*A01M 29/18* (2011.01)
(Continued)

(52) U.S. Cl.
CPC .......... *A01M 29/18* (2013.01); *B06B 1/0644* (2013.01); *G10K 9/122* (2013.01); *G10K 9/18* (2013.01); *G10K 13/00* (2013.01)

(58) Field of Classification Search
CPC .......... H04R 1/02; H04R 1/025; H04R 1/026; H04R 1/2803; H04R 1/2807;
(Continued)

(56) References Cited

U.S. PATENT DOCUMENTS 4,961,424 A * 10/1990 Kubota ............ A61B 17/22012
601/2
7,706,560 B2    4/2010 Takayama et al.
(Continued)

FOREIGN PATENT DOCUMENTS

JP    2007306237 A    11/2007
KR    20-0340630 Y1    2/2004
(Continued)

OTHER PUBLICATIONS

International Search Report issued in connection with the corresponding International Application No. PCT/KR2016/004257 dated Jul. 29, 2016.
(Continued)

*Primary Examiner* — Leshui Zhang
(74) *Attorney, Agent, or Firm* — The H.T. Than Law Group (57) ABSTRACT

The present invention relates to an ultrasonic generator for repelling harmful animals. The invention comprises a columnar ultrasonic wave generating body 18 which has a piezoelectric element 16 and a connecting body 22 and a smaller-diameter connecting body 24 each having a reduced diameter, a diaphragm 28 which is in the form of a speaker horn, and a connecting rod 26 which extends from the ultrasonic wave generating body 18 and connects and fixes the diaphragm 28 to an end thereof. The thickness of the diaphragm 28 gradually decreases from the base 34 connected to the connecting rod 26 toward an outer edge of the diaphragm 28 and one or more undulated portions 36 are formed concentrically on the front face of the diaphragm.

14 Claims, 6 Drawing Sheets

(51) Int. Cl.
*B06B 1/06* (2006.01)
*G10K 9/122* (2006.01)
*G10K 9/18* (2006.01)
*G10K 13/00* (2006.01)

(58) Field of Classification Search
CPC .. H04R 1/2834; H04R 1/2842; H04R 1/2861;
H04R 1/2865; H04R 1/2888; H04R 1/30;
H04R 1/34; H04R 1/345; H04R 1/347;
H04R 5/02; H04R 2201/02; H04R 7/00;
H04R 7/02; H04R 7/06; H04R 7/08;
H04R 7/10; H04R 7/12; H04R 7/122;
H04R 7/125; H04R 7/14; H04R 31/00;
H04R 2207/00; H04R 2307/021; H04R
2307/023; H04R 2307/025; H04R
2307/027; H04R 2307/029; H04R
2307/204; H04R 9/045; H04R 9/06;
H04R 11/02; H04R 2307/00; A01M
29/16; A01M 29/18; B06B 1/06–0696;
G10K 9/12; G10K 9/122; G10K 9/125;
G10K 9/18; G10K 9/20; G10K 9/22;
G10K 13/00

USPC ....... 381/332, 336, 337, 339, 340, 341, 345,
381/347, 348, 350, 184, 124;
181/148–154, 157, 159, 161, 162, 164,
181/165, 167–174
See application file for complete search history.

(56) References Cited

U.S. PATENT DOCUMENTS

2006/0088182 A1\* 4/2006 Takayama ................ H04R 7/20
381/398
2013/0100776 A1\* 4/2013 Karl ....................... G01H 13/00
367/137

FOREIGN PATENT DOCUMENTS

| KR | 10-1133506 B1 | 4/2012 |
| KR | 101133506 B1 \* | 4/2012 |
| KR | 20150007796 A | 1/2015 |

OTHER PUBLICATIONS

Machine translation of KR 20150007796 to Seog-tae Kim.
Machine translation of JP 2007306237 to Suzuki.
Machine translation of KR 10-1133506 to Kim.
Machine translation of KR 20-0340630.

\* cited by examiner

ULTRASONIC GENERATOR

TECHNICAL FIELD

The present invention relates to an ultrasonic generator for diffusing high output ultrasonic waves generated by a piezoelectric element through a diaphragm. Particularly, the present invention relates to an ultrasonic generator for repelling harmful animals, which is capable of preventing a diaphragm constituting a speaker horn from being damaged by a vibration impact due to the generation of high-output ultrasonic waves and is capable of arranging a diaphragm in the form of a speaker horn at various angles with respect to the axis of a ultrasonic wave generating body.

BACKGROUND ART

For the use as a repellent for harmful animals such as rats, birds or other pests, ultrasonic generators using piezoelectric elements are known. For example, the ultrasonic waves of 20 kHz or higher are used for repelling harmful animals.

In particular, such conventional ultrasonic generators that generate ultrasonic waves with high output to widen a region being affected are disclosed in, for example, Japanese Patent Application Laid-Open No. 2006-165923 (published on Jun. 22, 2006) "Piezoelectric ultrasonic vibrator", Korean Utility Model Registration No. 20-0409300 (published on Feb. 24, 2006) "Ultrasonic washer for vibrator structure", and the present applicant's Korean Patent No. 10-1505410 (published on May 25, 2015) "Ultrasonic generator for pest repeller".

Such conventional arts generally have a structure in which an ultrasonic wave generating body such as a piezoelectric element generating ultrasonic waves is attached to a diaphragm which receives and transmits the ultrasonic waves to emit the ultrasonic waves therefrom.

However, the above structure has a drawback that the joint portion between the ultrasonic wave generating body and the diaphragm is easily separated or broken due to the increased vibration impact to shorten a useful life of an ultrasonic generator. Also in the diaphragm, which is in the form of a speaker horn being connected to the ultrasonic wave generating body through an elongate connecting rod, the amplitude of the vibration generated by the ultrasonic waves is increased as the vibration moves toward the outer edge of the diaphragm, which causes an outer edge of the diaphragm to be cracked or ruptured after a long use, so that the effect of the ultrasonic waves generated for repelling harmful animals may be degraded.

DISCLOSURE OF THE INVENTION

Technical Problem

The present invention provides an ultrasonic generator for repelling harmful animals wherein a diaphragm constituting a speaker horn may be prevented from being damaged by a vibration impact caused by generation of high output ultrasonic waves and may be arranged at any variety of angles in the form of a speaker horn.

Technical Solution

The present invention provides an ultrasonic wave generating unit comprising a piezoelectric element which outputs ultrasonic waves when a voltage is applied; a diaphragm in the form of a speaker horn; and a connector which connects the ultrasonic wave generating unit and the diaphragm, wherein the connector transmits the output ultrasonic waves to the diaphragm to emit the ultrasonic wave through the diaphragm, and wherein the diaphragm has a thickness which gradually decreases from a point of the diaphragm connected to the connector toward an outer edge of the diaphragm.

Also, the diaphragm may comprise one or more undulated portions formed concentrically on the front face of the diaphragm.

Also, to the outer edge of the diaphragm, one or more rim protection rings may be inserted to mitigate a vibration impact.

Also, a plurality of the connector are provided and connected to each other in series and each diameter of the connectors relatively decreases as the connectors being far away from the ultrasonic wave generating unit.

Also, the connector and/or the diaphragm may be made of titanium.

Also, the connector may be in the shape of a straight line or others such as the letter "ㄱ" or the letter "S".

The present invention will now be described in more detail with reference to the accompanied drawings.

MODE FOR CARRYING OUT THE INVENTION

Figure 1:
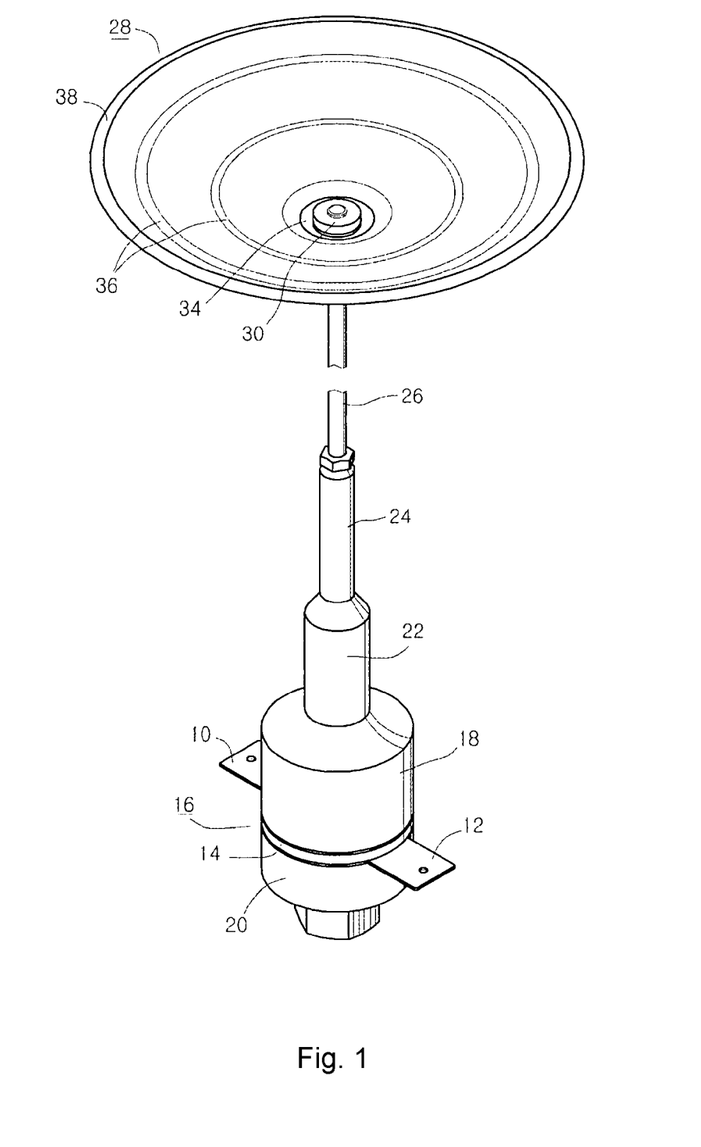
FIG. 1 is a perspective view showing an ultrasonic generator for repelling harmful animals according to the present invention.
Figure 2:
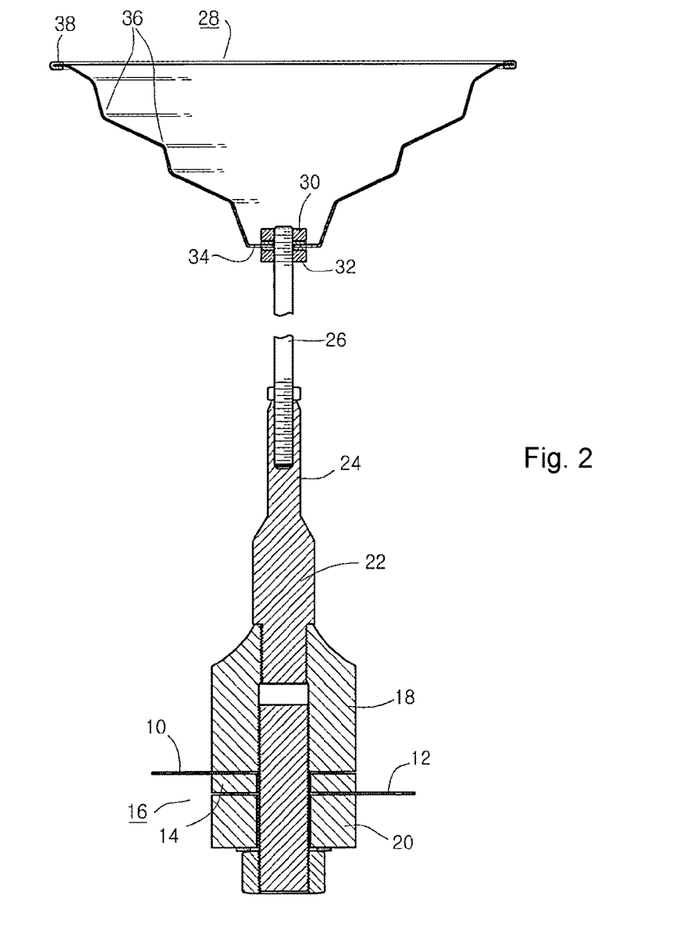
FIG. 2 is a cross-sectional view of the present invention.

Referring to FIGS. 1 and 2, an ultrasonic generator for repelling harmful animals according to the present invention comprises an upper and a lower electrodes 10 and 12 and a cylindrical shaped ultrasonic wave generating body 18 which has a piezoelectric device 16 which is comprised of (a) piezoelectric element(s) 14 arranged between the electrodes 10 and 12.

The ultrasonic wave generating body 18 may be made of any material known in the art, preferably duralumin.

To the lower side of the ultrasonic wave generating body 18, a supporting body 20 is fixed for fixing the piezoelectric device 16 to the ultrasonic wave generating body 18. On the other hand, on a distal end of the ultrasonic wave generating body 18, a connecting body 22 having a diameter reduced to about ½ of the diameter of the ultrasonic wave generating body 18, a smaller-diameter connecting body 24 of a diameter reduced to about ½ of the diameter of the connecting body 22, and a connecting rod 26 having a diameter reduced to about ½ of the diameter of the smaller-diameter connecting body 24 are connected and fixed in turn. Such a connecting rod 26 may be made of any material known in the art, preferably titanium.

Onto the upper end of the connecting rod 26, a diaphragm 28 as the form of a speaker horn is inserted and fastened and fixed with an upper and a lower coupling nut 30 and 32. The diaphragm 28 can be made of any material known in the art, preferably titanium which has excellent durability against vibration.

Figure 3:
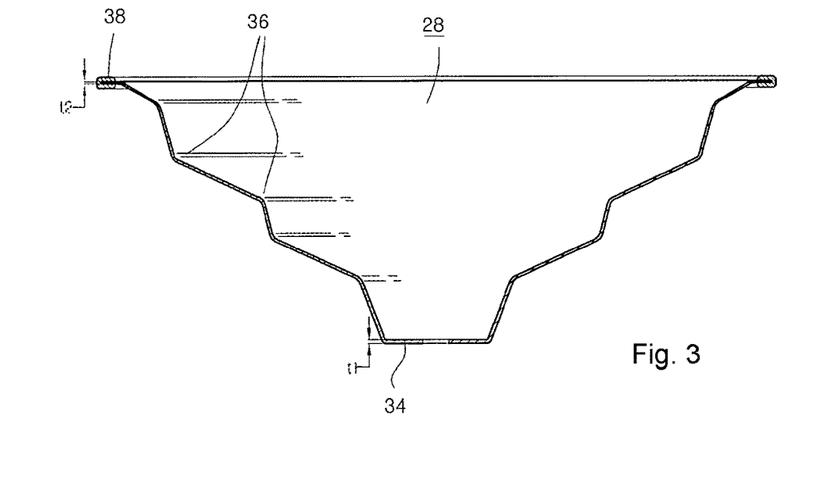
FIG. 3 is a cross-sectional view of a diaphragm in the form of a speaker horn, which is a major part of an ultrasonic generator for repelling harmful animals according to the present invention.

The diaphragm 28, which is generally of a cone shape in the form of a speaker horn, expands toward its end from its base 34 which is fixed to the connecting rod 26. To the diaphragm 28 the strong ultrasonic vibration outputs from the ultrasonic wave generating body 18 are applied, which causes the diaphragm 28 to vibrate and diffuse and emit the ultrasonic waves from its front. The amplitude of the ultrasonic vibration being applied to the diaphragm 28 becomes larger as the vibration moves outward from the base 34 on which the diaphragm 28 is fixed to the connecting rod 26, and the ultrasonic vibration becomes maximized at a radially outer edge of the diaphragm 28. Therefore, the outer edge of the diaphragm 28 is susceptible to cracking or rupture due to the vibration impact.

Figure 8:
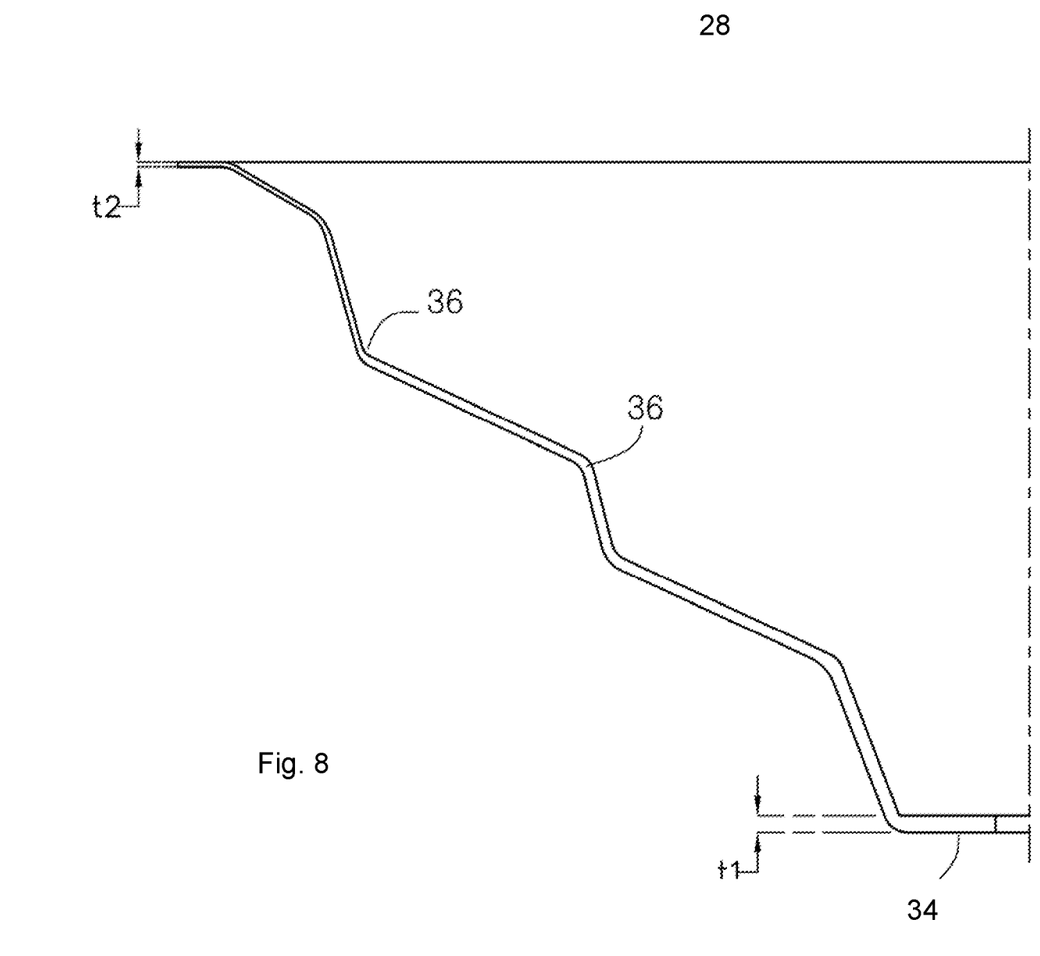
FIG. 8 is a partial cross-sectional view showing an exaggerated cross section of the diaphragm shown in FIG. 3.

In the present invention, the thickness of the diaphragm 28 may be also gradually decreased from the base 34 of the diaphragm 28 so that the outer edge may have a relatively thinner thickness than that of the base 34. As such, the outer edge of the diaphragm 28 may adapt to the vibration impact, with having flexibility. In an example of the present invention, thickness t1 at the base 34 of the diaphragm 28 may be about 1.0 to 1.5 mm, preferably 1.2 mm, which may be gradually decreased to thickness t2 of about 0.7 to 0.9 mm, preferably 0.8 mm at the outer edge of the diaphragm 28 (See FIGS. 3 and 8).

According to an embodiment of the present invention, the thickness of the diaphragm 28 may be gradually reduced from the base 34 toward the outer edge as described above so that the diaphragm 28 may flexibly respond to the vibration impact of the ultrasonic vibration, while forming a number of undulated portions 36 concentrically on the front face of the diaphragm 28 which is structurally in the form of a cone. Thus, the amplitudes of the ultrasonic vibrations may be effectively attenuated and the vibration impact may be considerably mitigated, thereby helping to prevent generation of cracks or rupture at the outer edge of the diaphragm 28.

Figure 4:
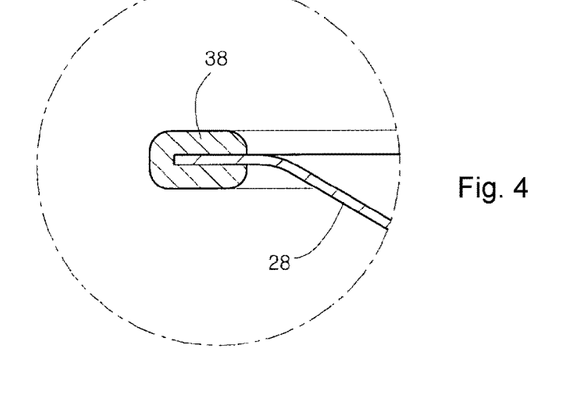
FIG. 4 is an enlarged cross-sectional view of an outer edge of a diaphragm according to the present invention.

In an example of the present invention, as shown in FIGS. 3 and 4, the outer edge of the diaphragm 28 is provided with one or more circular rim protection rings 38 having a cross section of the letter "⊏" shape, which may also mitigate the impact from the ultrasonic vibration and protect the relatively thin outer edge of the diaphragm 28 from cracking or rupture. The rim protection rings 38 may be made of any known soft material such as synthetic resin, rubber, silicone, and the like.

According to another embodiment of the present invention, the diaphragm 28 of the ultrasonic generator may be arranged at any variety of angles.

Figure 5:
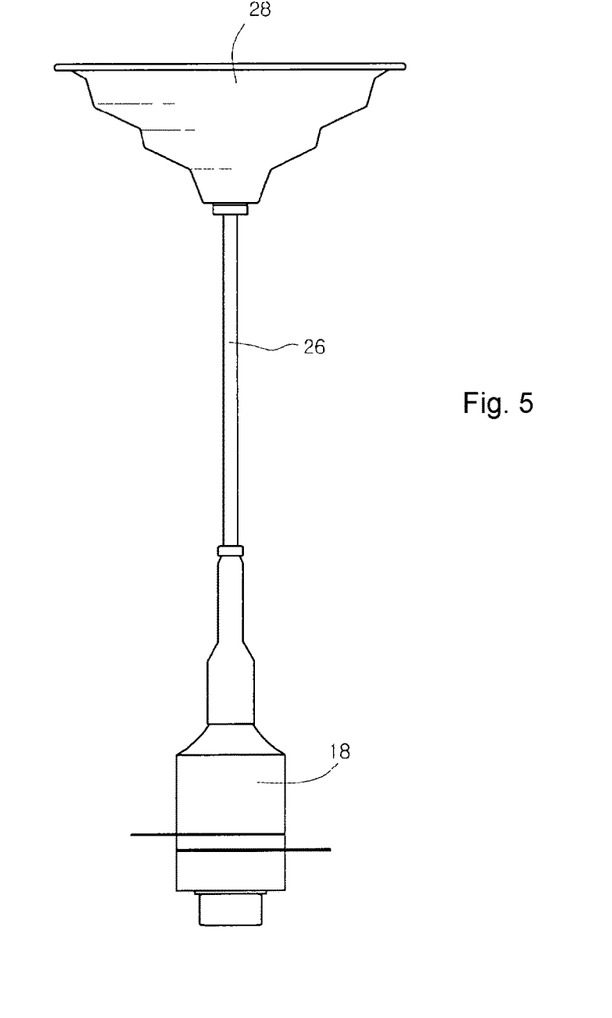
FIG. 5 is a front view of an ultrasonic generator for repelling harmful animals, in which the axis of the diaphragm is aligned with the axis of the ultrasonic wave generating body.

For this purpose, for example, as shown in FIGS. 1, 2 and 5, when connecting the diaphragm 28 to the connecting rod 26 which has an axis aligned with the axis of the ultrasonic wave generating body 18, the axis of the diaphragm 28 is aligned with the axis of the ultrasonic wave generating body 18, so that the diaphragm 28 may be arranged either vertically or horizontally depending on whether the ultrasonic wave generating body 28 is arranged either vertically or horizontally. Therefore, the diffusion of the generated ultrasonic waves may be directed in a vertical or horizontal direction and the other arrangement angles of the diaphragms 28 will depend on the arrangement angle of the ultrasonic wave generating body 18.

Figure 6:
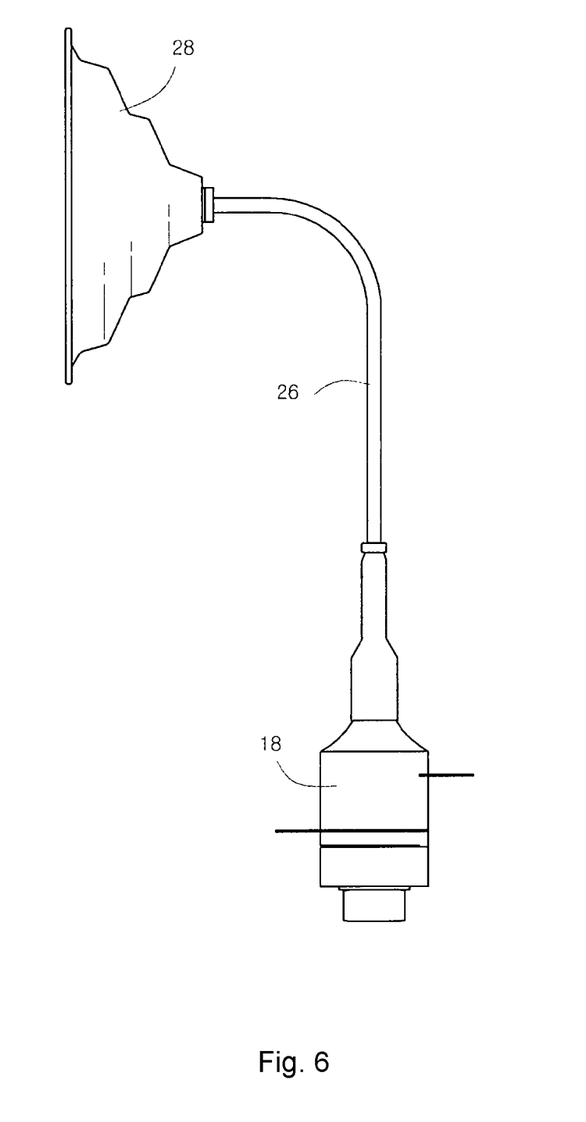
FIGS. 6 and 7 are front views showing the examples in which the diaphragm may be oriented in various directions by changing the shape of a connecting rod which connects the diaphragm to the ultrasonic wave generating body, so that the ultrasonic generator for repelling harmful animals may be installed in any variety of manners.
Figure 7:
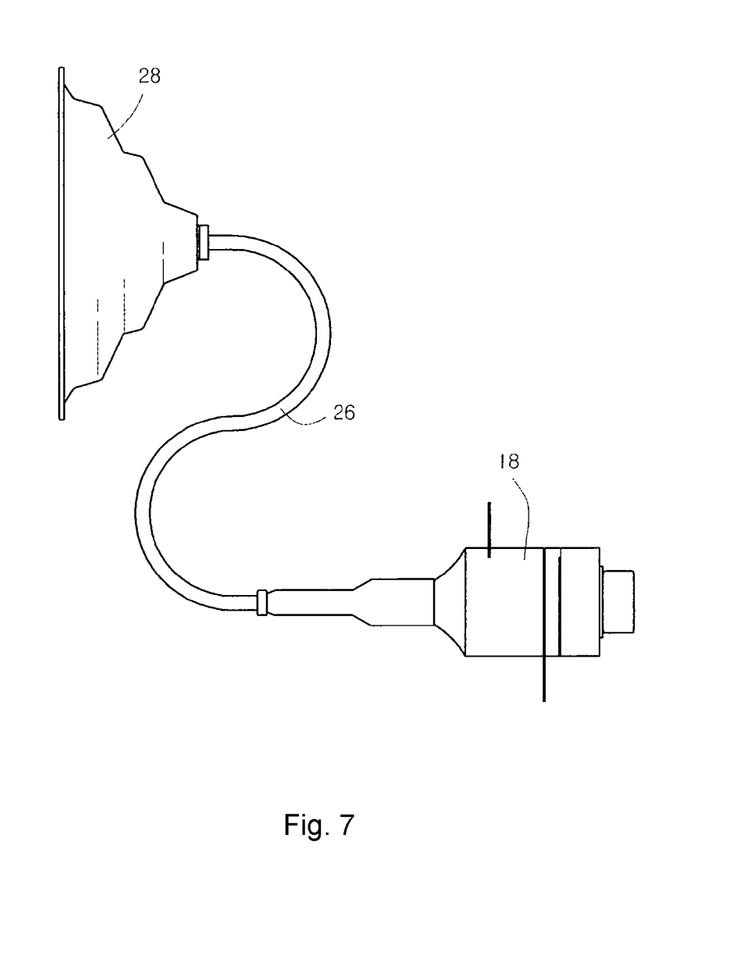

FIG. 6 shows that the connecting rod 26 which connects the ultrasonic wave generating body 18 and the diaphragm 28 is of the letter "⌐" shape. This is a structure in which the axis of the diaphragm 28 is horizontally arranged when the ultrasonic wave generating body 18 is vertically arranged, which enables arranging the ultrasonic generator of the present invention in various manners. Also, FIG. 7 shows that the connecting rod 26 which connects the ultrasonic wave generating body 18 and the diaphragm 28 is of the letter "S" shape. In this structure, the axis of the diaphragm 28 is horizontally arranged when the ultrasonic wave generating body 18 is horizontally arranged, which also enables the various arrangements of the ultrasonic generator in the present invention. Although only the letter "⌐" and the letter "S" shapes are shown here, the present invention is not limited thereto and also may include all the other formable or variable shapes for the connecting rod 26.

It should be construed that foregoing general illustrations and following detailed descriptions are exemplified, and also it will be understood by those skilled in the art that various modifications, changes, and additions in form and details may be made therein without departing from the spirit and scope of the invention as defined by the appended claims.

The invention claimed is:

1. An ultrasonic generator comprising
an ultrasonic wave generating unit comprising a piezoelectric element which outputs ultrasonic waves when a voltage is applied;
a diaphragm in a form of a speaker horn; and
a connector which connects the ultrasonic wave generating unit and the diaphragm, wherein the connector transmits the output ultrasonic waves to the diaphragm to emit the ultrasonic wave through the diaphragm,
wherein the diaphragm has a thickness which gradually decreases from a point of the diaphragm connected to the connector toward an outer edge of the diaphragm.

2. The ultrasonic generator of claim 1, wherein one or more rim protection rings are inserted to a outer edge of the diaphragm to mitigate a vibration impact.

3. The ultrasonic generator of claim 1, wherein the connector is composed of plurality of parts which are connected to each other in series and each of which has a diameter relatively decreasing as being far away from the ultrasonic wave generating unit.

4. The ultrasonic generator of claim 1, wherein the connector is made of titanium.

5. The ultrasonic generator of claim 1, wherein the diaphragm is made of titanium.

6. The ultrasonic generator of claim 1, wherein the connector is in a shape of a straight line.

7. The ultrasonic generator of claim 1, wherein the connector is in the shape of either the letter "⌐" or the letter "S".

8. An ultrasonic generator comprising
an ultrasonic wave generating unit comprising a piezoelectric element which outputs ultrasonic waves when a voltage is applied;
a diaphragm in a form of a speaker horn; and
a connector which connects the ultrasonic wave generating unit and the diaphragm, wherein the connector transmits the output ultrasonic waves to the diaphragm to emit the ultrasonic wave through the diaphragm, wherein the diaphragm bias a thickness which gradually decreases from a point of the diaphragm connected to the connector toward an outer edge of the diaphragm, wherein the diaphragm includes a plurality of undulated portions which is formed on a front face of the diaphragm concentrically around the point of the diaphragm, being repeatedly spaced from each other from an outer edge of the diaphragm to the point of the diaphragm connected to the connector and each of which has a diameter relatively decreasing toward the point of the diaphragm from the outer edge of the diaphragm.

9. The ultrasonic generator of claim 8, wherein one or more rim protection rings are inserted to a outer edge of the diaphragm to mitigate a vibration impact.

10. The ultrasonic generator of claim 8, wherein the connector is composed of a plurality of parts which are connected to each other in series and each of which has a diameter relatively decreasing as being far away from the ultrasonic wave generating unit.

11. The ultrasonic generator of claim 8, wherein the connector is made of titanium.

12. The ultrasonic generator of claim 8, wherein the diaphragm is made of titanium.

13. The ultrasonic generator of claim 8, wherein the connector is in a shape of a straight line.

14. The ultrasonic generator of claim 8, wherein the connector is in the shape of either the letter "¬" or the letter "S".

* * * * *